(12) United States Patent
Takano et al.

(10) Patent No.: US 8,790,563 B2
(45) Date of Patent: Jul. 29, 2014

(54) METHOD OF PRODUCING MOLDED ARTICLE OF FIBER-REINFORCED COMPOSITE MATERIAL AND THE MOLDED ARTICLE

(75) Inventors: Tsuneo Takano, Toyohashi (JP); Kiharu Numata, Toyohashi (JP); Akihiro Itou, Toyohashi (JP); Masato Taguchi, Toyohashi (JP); Junnichi Muramatsu, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 1397 days.

(21) Appl. No.: 10/525,677

(22) PCT Filed: Aug. 20, 2003

(86) PCT No.: PCT/JP03/10516
§ 371 (c)(1),
(2), (4) Date: Feb. 18, 2005

(87) PCT Pub. No.: WO2004/018186
PCT Pub. Date: Mar. 4, 2004

(65) Prior Publication Data
US 2005/0253294 A1 Nov. 17, 2005

(30) Foreign Application Priority Data

Aug. 20, 2002 (JP) ................................ 2002-239625
Mar. 26, 2003 (JP) ................................ 2003-86132

(51) Int. Cl.
*B27N 3/10* (2006.01)
*B29C 70/54* (2006.01)
*B29C 70/34* (2006.01)
*B29K 105/24* (2006.01)
*B29L 31/52* (2006.01)
*B29L 25/00* (2006.01)
*B29K 105/06* (2006.01)
*B29L 31/30* (2006.01)

(52) U.S. Cl.
CPC ............... *B29C 70/34* (2013.01); *B29C 70/543* (2013.01); *B29K 2105/246* (2013.01); *B29C 2791/002* (2013.01); *B29L 2031/5227* (2013.01); *B29L 2025/00* (2013.01); *B29K 2105/06* (2013.01); *B29C 2791/001* (2013.01); *B29L 2031/30* (2013.01); *B29C 2793/0009* (2013.01); *B29C 2793/0081* (2013.01); *B29C 70/345* (2013.01)
USPC ........... 264/257; 264/258; 264/259; 264/262; 264/263; 264/266; 264/294; 264/297.4; 264/241; 264/510

(58) Field of Classification Search
USPC ............... 264/241, 257, 258, 266, 295, 297.4
See application file for complete search history.

(56) References Cited

U.S. PATENT DOCUMENTS 2,956,916 A * 10/1960 Voss et al. .................. 2/412
(Continued)

FOREIGN PATENT DOCUMENTS

EP 0319895 6/1989
(Continued)

OTHER PUBLICATIONS

European Search Report dated Jan. 23, 2007 issued for corresponding European Patent Application No. 03792742.

(Continued)

*Primary Examiner* — Jeffrey Wollschlager
*Assistant Examiner* — Stella Yi
(74) *Attorney, Agent, or Firm* — McDermott Will & Emery LLP

(57) ABSTRACT

A method is presented for stably, highly, and efficiently producing a three-dimensional molded article of a fiber-reinforced composite material having a three-dimensional shape, uniform quality, and free from wrinkles by press molding a plurality of prepregs cut out in a predetermined shape and also to a molded article.

17 Claims, 6 Drawing Sheets

(56) References Cited

U.S. PATENT DOCUMENTS

| | | | |
|---|---|---|---|
| 3,547,764 A * | 12/1970 | Amerongen | 442/71 |
| 3,956,447 A * | 5/1976 | Denommee et al. | 264/135 |
| 4,990,207 A * | 2/1991 | Sakai et al. | 156/242 |
| 5,112,667 A * | 5/1992 | Li et al. | 428/113 |
| 5,198,167 A * | 3/1993 | Ohta et al. | 264/86 |
| 5,879,608 A * | 3/1999 | Lammeck et al. | 264/239 |

FOREIGN PATENT DOCUMENTS

| | | |
|---|---|---|
| FR | 1092605 | 4/1955 |
| JP | 61-106227 A | 5/1986 |
| JP | 6-98953 A | 4/1994 |
| JP | 8-509921 A | 10/1996 |

OTHER PUBLICATIONS

Abstract of JP61106227 published on May 24, 1986.
Abstract of WO9426492 (JP8-509921) published on Nov. 24, 1994.
Patent Abstracts of Japan for 06-098953 published on Apr. 12, 1994.
International Search Report for PCT/JP03/10516 mailed Dec. 9, 2003.

* cited by examiner though the prepreg is laminated on the semispheric press die 20 or 21. In this case, the neighboring end edge parts of the notches 3b or cutouts 4b are laid over. Next, the counterpart press die is put on and press-molding is carried out to obtain a molded article with a semispherical shape as a whole.

METHOD OF PRODUCING MOLDED ARTICLE OF FIBER-REINFORCED COMPOSITE MATERIAL AND THE MOLDED ARTICLE

CROSS-REFERENCE TO PRIOR APPLICATION

This is a U.S. National Phase application under 35 U.S.C. §371 of International Patent Application No. PCT/JP2003/010516 filed Aug. 20, 2003, and claims the benefit of Japanese Patent Application Nos. 2002-239625 filed Aug. 20, 2002 and 2003-86132 filed Mar. 26, 2003, both of which are incorporated by reference herein. The International Application was published in Japanese on Mar. 4, 2004 as WO 2004/018186 A1 under PCT Article 21(2).

TECHNICAL FIELD

The invention relates to a method of producing a three-dimensional molded article of a fiber-reinforced composite material, and particularly to a method of producing a molded article of a fiber-reinforced composite material which is suitable for efficiently producing a molded article with a three-dimensional shape with a high curvature and good appearance using a plurality of prepregs.

BACKGROUND ART

Conventionally, to form a molded article of a fiber-reinforced composite material with a three-dimensional shape such as a container-like shape using prepreg obtained by impregnating a reinforcing fiber with a matrix resin, in the case the three-dimensional shape is moderately projected or recessed shape with a small curvature, it can be formed easily by pressing and extending the prepreg from both sides by a press die having a desired shape.

For example, in a method of producing a golf club as disclosed in Japanese Patent Application Laid-Open No. 6-98933 (Patent Document 1), when preliminarily molding a portion of ahead of a golf club with a three-dimensional shape, the portion of the head is divided into a plurality of parts and the respective parts are molded by pressing prepreg cut into predetermined shapes. The respective parts of the head preliminarily molded in such a manner and a preliminarily molded shaft are inserted into a hollow molding die, pressure is applied to these preliminarily molded articles from an inner side of the articles to heat and mold them. Consequently, the shaft and the respective parts of the head are joined and united to produce a golf club.

However, in the case where a molded article has an uneven shape with a high curvature, it is inevitable for a method of producing a three-dimensional molded article by press-molding prepreg using a press die that wrinkles are formed by press-molding a sheet-like prepreg on a press die face having similarly an uneven face with a high curvature. Therefore, in the case of molding a three-dimensional shape with a high curvature, partial notches or cutouts are formed previously in prepregs, and the prepregs are laminated and molded in such a manner that end edge parts of the notches or cutouts are laid over so as not to form wrinkles.

For example, in the case of forming a semi-spherical shape, as illustrated in FIG. 10, first prepreg is cut into a circular shape and with a center portion 3a of a circular prepreg 3 being left, a plurality of notches 3b are radially formed at equal intervals, or alternatively, as illustrated in FIG. 11, with a center portion 4a of a circular prepreg 4 left, a plurality of cutouts 4b are radially formed at equal intervals. Successively, with the center portions 3a, 4a of the circular prepreg 3, 4 fitted in a summit part of a press die (a third press die to be described later) 20 having a semispheric projected part 20a as illustrated in FIG. 6 or fitted in the bottom center part of a press die (a fourth press die to be described later) 21 having a semicircular concave part 21a as illustrated in FIG. 7, the prepreg is laminated on the semispheric press die 20 or 21. In this case, the neighboring end edge parts of the notches 3b or cutouts 4b are laid over. Next, the counterpart press die is put on and press-molding is carried out to obtain a molded article with a semispherical shape as a whole.

Conventionally, the step of laying the prepreg on the press die and overlapping the end edge parts of the notches or cutouts is carried out manually in general. Therefore, by the above-mentioned method, a molded article is obtained with quality insufficient in stability and unsatisfactory in the uniformity and productivity as well. Further, at the time of putting the counterpart press die to carry out press-molding, in the case the overlapping of the end edge parts of the notches or cutouts is insufficient or unstable, wrinkling tends to be caused in the end edge parts owing to entrainment of them and also the arrangement of the reinforcing fiber is disordered. Therefore, the above-mentioned method is regarded to be difficult to be employed for producing a molded article required to have a high strength and good appearance.

The invention has been accomplished so as to solve the above-mentioned problems, and an object of the invention is to provide a method of producing a molded article of a fiber-reinforced composite material having a three-dimensional shape by pressing using prepreg cut off in a predetermined shape, which is a method of stably and efficiently producing a molded article of a fiber-reinforced composite material having uniform quality without wrinkles, and to give a preliminarily molded article and a completed molded article by the method.

DISCLOSURE OF THE INVENTION

A feature of the invention is basically a method of producing a molded article of a fiber-reinforced composite material by simultaneously molding a plurality of sheets of prepreg cut out in a predetermined shape, the method including the steps of:

(1) forming a plurality of notches or cutouts in the respective prepregs so as to form at least one set of a partially separated flap and a residual portion for each prepreg;

(2) arranging the respective prepregs at predetermined portions of a press die using the partially separated flaps of the prepregs as positioning pieces;

(3) forming a desired three-dimensional shape by pressing the partially separated flaps of the respective prepregs; and (4) forming a desired three-dimensional shape as a whole by overlapping end edge parts of the residual portions on the partially separated flaps and pressing them.

The molded article of the fiber-reinforced composite material in the invention includes not only a final product itself but also a preliminarily molded article before formation to be a final product by joining and uniting another part or further forming it by another method. Overlapping and arranging a plurality of prepregs in the invention means that a plurality of sheets are laid over and arranged when they are set in a die and also includes successively overlapping the sheets while positioning each sheet one by one in the die; or laminating a plurality of prepregs before they are set in a die and then laying the resulting laminate on the die while positioning the laminate.

Further, a method of respectively forming at least one set of the separated flap and the residual portion for each prepreg may be a method of forming at least one set of the separated flap and the residual portion for each prepreg by layering a plurality of prepregs cut out in a predetermined shape for obtaining a laminate and forming a notch or cutout in the laminate, or a method of forming at least one set of the separated flap and the residual portion for each prepreg by forming a notch or cutout separately in each prepreg.

In the case of the former method, the partially separated flaps and the residual portions are formed simultaneously in the plurality of prepregs to result in improved productivity. On the other hand, in the case of the latter method, although the notch or cutout is formed for each prepreg one by one, it is made easy to form a desired shape of the partially separated flap for each prepreg as described hereinafter.

According to the above-mentioned production method, the partially separated flaps separated by notches or cutouts are pressed to mold a three-dimensional shape and then parts of the residual portions are laid over parts of the separated flaps and independently pressed, so that the molding work can be made easy. In addition, even in the case of clamping, neither wrinkle nor disorder of arrangement of the reinforcing fiber attributed to pulling of end edges of the notches or cutouts is caused.

It is desirable that the notches or cutouts of a plurality of prepregs to be laid over are formed so as to be at least two different positions. When the respective prepregs are laid over after three-dimensional shape formation, even if a gap is formed in the notches or cutouts of each prepreg, use of a plurality of such prepregs prevents formation of partially thickened parts and gives the whole body completely free from voids, since between the respective prepregs, the overlapped portions of parts of the separated flaps are not flocked due to their bias, thereby considerably and efficiently contributing improvement of the appearance and the strength.

Also, according to the invention, it is preferable to form the shape of the partially separated flap of each prepreg to be approximately similar to or same as that of another prepreg among a plurality of prepregs. Further, it is preferable to form the notches or cutouts for the partially separated flaps of the respective prepregs to be laid over at same position such that a width of the partially separated flaps, which are positioned nearer to the concave face side by pressing, is wider. Molding in such conditions makes it possible to simultaneously carry out a molding by a series of steps and at the same time, to carry out a molding with properly amending a curvature difference between the inner face side and the outer face side in the case where the number of the object sheets to be laid over is large.

In addition, according to the invention, it is preferable that the end edges of the notches or cutouts forming the respective partially separated flaps of prepregs are made approximately parallel or narrower toward an outer circumferential part. With this constitution, wrinkling of a molded article owing to the interference of the partially separated flaps and the press die can be prevented.

Further, in a plurality of prepregs to be laminated, it is preferable to form the notches or cutouts of the respective prepregs at distance of 2 mm or longer between the tip ends in a center side.

In the molding of the invention, the residual portions are laid over the partially separated flaps. In the case where the terminal end positions of the notches or cutouts are coincident in a state where a plurality of prepregs are laid over, since it is difficult to lay the residual portions over the partially separated flaps at the terminal end positions owing to the interference of the plurality of prepregs, openings may be formed at the terminal end positions upon molding.

To avoid such openings, it is preferable to keep the tip ends of the respective notches or cutouts of a plurality of prepregs at intervals of 2 mm or longer from one another in the center side. If each of the intervals becomes approximately 2 mm or shorter, the terminal ends of the notches or cutouts of the respective prepregs are concentrated around one point and so-called aperture after molding is converged. Such an aperture may result in considerable decrease of the strength of a product to be obtained.

Keeping the tip ends of the respective notches or cutouts of a plurality of prepregs at intervals of 2 mm or longer from one another makes it possible to cover the aperture formed in one prepreg with another prepreg, and thus gives a molded article with good appearance as a whole molded article and high strength. The distance of terminal ends apart one another can properly be determined depending on the curvature of a molded article to be obtained. It is sufficient that the terminal ends of the notches or cutouts of different prepregs are not brought into contact with one another, and particularly, if the distance is 5 mm or longer, such a problem as described is hardly caused even in the case of a molded article with a high curvature.

As a reinforcing fiber in the invention, a reinforcing fiber selected from a group consisting of carbon fiber, glass fiber and organic fiber (including aramid fiber and PBO fiber) are preferable to be used for prepreg. Further, prepreg of unidirectional materials or fabrics in which the reinforcing fiber is arranged in one direction is preferable to be used. However, the materials of the reinforcing fiber and the prepreg structure may properly be selected depending on the uses and required strength of the molded article of a fiber-reinforced composite material, and the lamination may be carried out by properly combining the fiber directions.

As a matrix resin in the invention, if an epoxy resin excellent in the adhesion strength to a reinforcing fiber is used, it is preferable since a final product is provided with a high strength. Particularly, it is preferable to use an epoxy resin composition comprising the following components A, B, C, and D:

component A: an epoxy resin;
component B: an amine compound (component B-1) having at least one sulfur atom in a molecule and/or a reaction product (component B-2) of an amine compound having at least one sulfur atom in a molecule with an epoxy resin;
component C: an urea compound; and
component D: a dicyanodiamide.

The contents of the sulfur atom and the component C in the epoxy resin composition are preferably 0.2 to 7% by mass and 1 to 15% by mass, respectively, and further the component C is preferable to be granular material with an average particle diameter of 150 μm or smaller. Use of such an epoxy resin composition as a thermosetting resin provides a molded article of a fiber-reinforced composite material excellent in the appearance in a very short time according to the invention. The molded article of a fiber-reinforced composite material according to the invention includes, as described before, a preliminarily molded article of which the thermosetting resin (the epoxy resin composition) is not yet completely cured.

According to the above-mentioned production method of the invention, a preliminarily molded article for a molded article of a fiber-reinforced composite material formed of prepreg can be produced. A final product with excellent appearance can be produced in a short time by heating and pressurizing the preliminarily molded article. Particularly, employment of the compacting molding in such a process is preferable since a molding can be carried out at a high pressure thereby hardening in a short time.

BEST MODE FOR CARRYING OUT THE INVENTION

Hereinafter, the embodiments of invention will be described more particularly with reference to drawings while exemplifying a case of producing a semi-spherical molded article of a fiber-reinforced composite material. However, the invention is not to be considered as being limited by the drawings and exemplified methods but is only limited by the scope of the appended claims.

First, a method of forming notches or cutouts in respective prepregs will be described.

Figure 1:
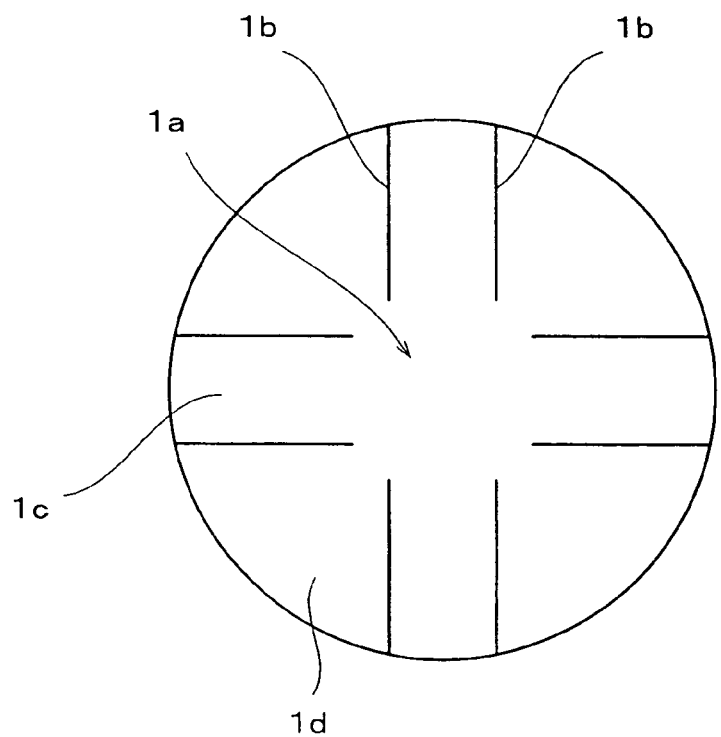
FIG. 1 is a plane view showing formation of four sets of partially separated flaps and residual portions by forming notches in a circular sheet of prepreg.

In the case of producing a semi-spherical molded article of a fiber-reinforced composite material, first prepreg is cut to be circular. As shown in FIG. 1, four sets of notches $1b$, each set comprising two parallel line-like notches $1b$, are formed with a center portion $1a$ left in a circular prepreg 1 and four partially separated flaps $1c$ are formed crosswise around the center portion $1a$ between neighboring notches such that each partially separated flap $1c$ is sandwiched between the notches $1b$ and the center portion $1a$, thereby four residual portions $1d$ with a fan-like shape are formed between respectively neighboring partially separated flaps $1c$. Additionally, the prepreg is not necessarily required to be cut in a circular shape but may be in a proper shape just like an elliptical, fan-like or rectangular shape in the case of molding into a shape other than the semi-spherical shape and cut in a desired shape depending on the necessity. The notches $1b$ are also not necessarily required to be parallel, and it is desirable to form the respective partially separated flaps $1c$ as to make the pieces narrower toward the outer circumference. It is preferable to make the pieces at least not to be wider toward the outer circumference in order to surely eliminate the risk of interference between the partially separated flaps and the die at the time of molding by the first press die, as described later.

Figure 2:
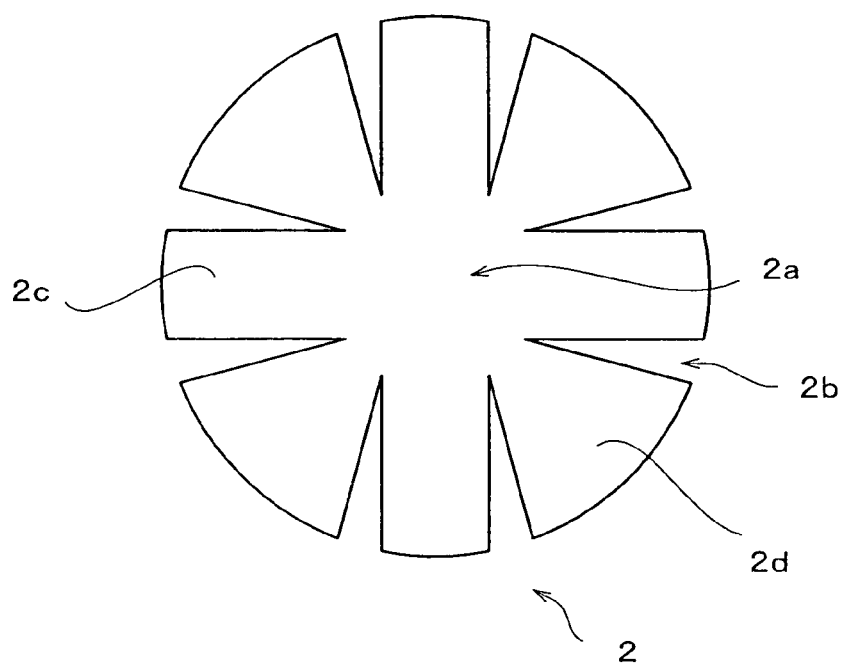
FIG. 2 is a plane view showing formation of four sets of partially separated flaps and residual portions by forming cutouts in a circular sheet of prepreg.

On the other hand, like a circular prepreg 2 as shown in FIG. 2, four sets of crosswise partially separated flaps $2c$ are formed with a center portion $2a$ left, and edge parts of the respective notches in fan-like residual portions $2d$ neighboring the respective partially separated flaps $2c$ may further be cut out in a triangular shape to form cutouts $2b$. In this example, in the case of press-molding, unneeded overlapping between neighboring partially separated flaps $2c$ and residual portions $2d$ pinching the cutouts $2b$ can be eliminated to narrow the surface area of the overlapping parts and to make the weight light. In this case also, the end edge parts of the cutouts in the partially separated flaps $2c$ are not necessarily required to be parallel and may be made narrower toward the outer circumference and at least it is preferable for them not to become wider.

If there is a set of the partially separated flap and residual portion formed by the notches or cutouts, it is made possible to form a desired three-dimensional shape, but, in order to give more stable shape, two, particularly four or more sets, are preferable to be formed.

A method of shape formation using cut prepreg will be described. As shown in FIG. 1, hereinafter an example using three sheets of prepreg obtained by incising circular prepreg will be described with reference to drawings. However, the invention is not to be considered as being limited by the following description and drawings, two or more sheets, or four or more sheets, may be laminated and simultaneously molded.

Figure 3:
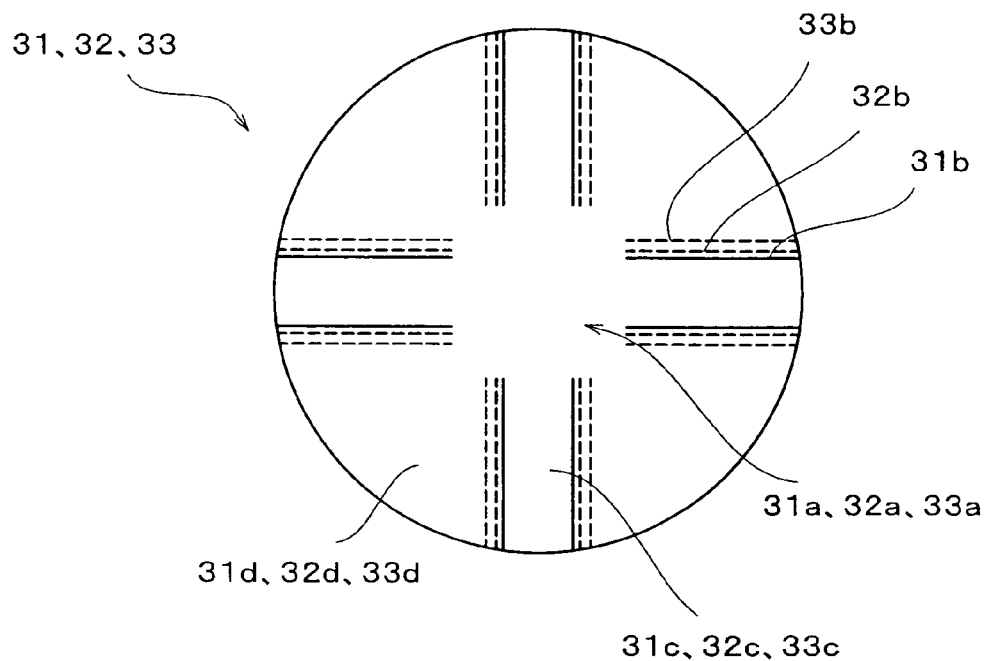
FIG. 3 is a plane view of a laminate obtained by laying three circular sheets of prepreg.

First, as shown in FIG. 3, circularly cut three sheets of prepreg 31 to 33 are laminated. These circular prepreg sheets 31 to 33 may be obtained by cutting out a large sheet of prepreg or by forming respectively produced different types of prepregs into a single shape. In this drawing, three prepreg sheets 31, 32, and 33 are made to have the same center portion shape, and the prepreg sheets are laminated in such a manner that the width of the partially separated flaps $31c$, $32c$, and $33c$ is successively widened more from the prepreg 31 in the uppermost layer to the prepreg 33 in the lowest layer and that the right and left edge parts of the respective notches $31b$, $32b$, and $33b$ are exposed successively in the right and left sides.

Additionally, the partially separated flaps $31c$ to $33c$ are not necessarily formed in such a manner. However, it is preferable that the width of the partially separated flap in the layer side where the concave face is formed by press-molding is not made narrower than that of the partially separated flap in the layer side where the convex face is formed. If the width of the partially separated flap in the layer side where the concave face is formed is made wider than that of the partially separated flap in the layer side where the convex face is formed, the partially separated flaps may possibly be entrained in the die.

In addition, for the same reason, it is preferable that the shapes of the laminated partially separated flaps are approximately similar to and same as one another. If the shapes of the respective partially separated flaps are considerably different, the partially separated flaps may possibly be entrained in the die, and a molded article to be obtained may possibly have parts with uneven thickness when the residual portions are laminated.

Next, a method of laminating and molding a plurality of circular prepreg sheets 31, 32 and 33 will be described step by step. First, after only the partially separated flaps $31c$, $32c$, and $33c$ are curved semi-spherically and molded using a press die, the residual portions $31d$, $32d$, ad $33d$ are curved semi-spherically and molded while partially being laid over the partially separated flaps 31c, 32c, and 33c.

Hereinafter, a practical molding method will be described.

Figure 4:
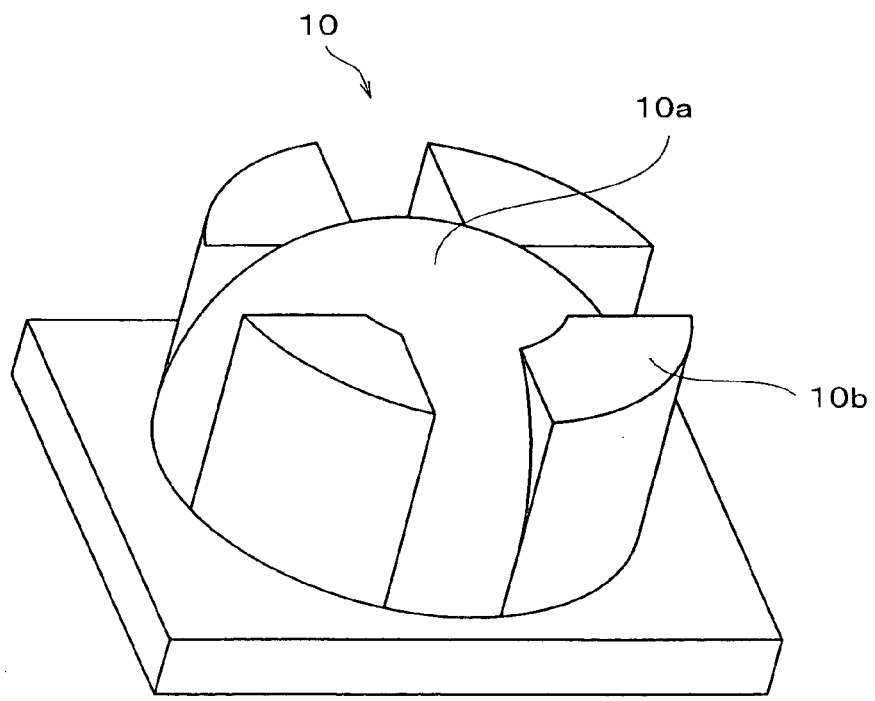
FIG. 4 is a schematic view showing a typical example of a first press die.
Figure 5:
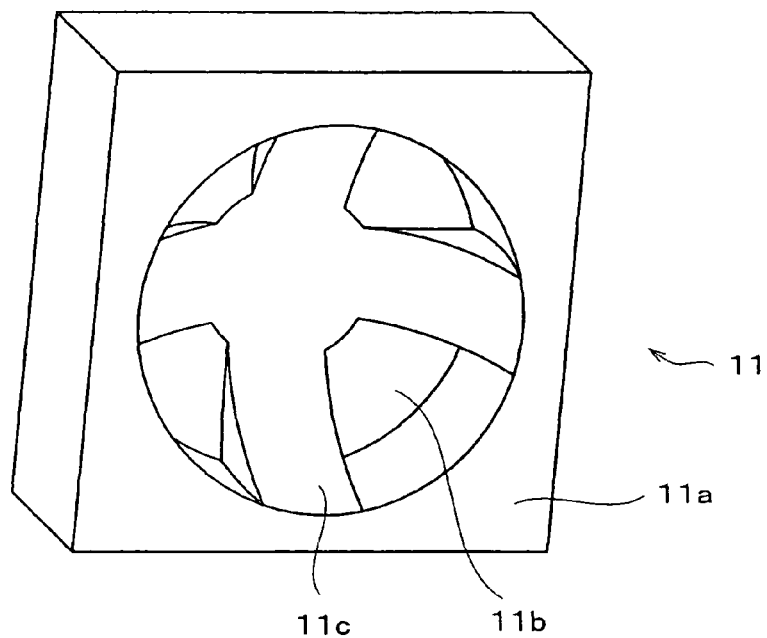
FIG. 5 is a schematic view showing a typical example of a second press die.

First, when the respective prepregs 31 to 33 are laminated and the partially separated flaps 31c to 33c of them are curved semi-spherically and molded, a first press die 10 shown in FIG. 4 and a second press die 11 shown in FIG. 5 are employed. The first press die 10 is for forming the concave face side, that is, the inner side face, of the semi-spherical shape of a molded article, and has a recessed groove part 10a with crosswise semi-spherical face. Fan-like projected parts 10b having flat top faces are projected to approximately same height as that of the summit of the part 10a at the positions corresponding to the residual portions 31d to 33d of the circular prepreg sheets 31 to 33. Three prepreg sheets 31 to 33 may be set one by one in the first press die 10 to be laminated, and as shown in FIG. 3, they may previously be laminated and then set in the first press die 10.

On the other hand, the second press die 11 has a shape to be fitted on the semi-spherical recessed groove part 10a and is fitted at a predetermined interval to the first press die 10. The second press die 11 has a circular aperture part 11b in the center of a frame body 11a and crosswise semi-spherical projections 11c to be fitted between the neighboring fan-like projected parts 10b and on the surface of the crosswise recessed groove part 10a.

Figure 8:
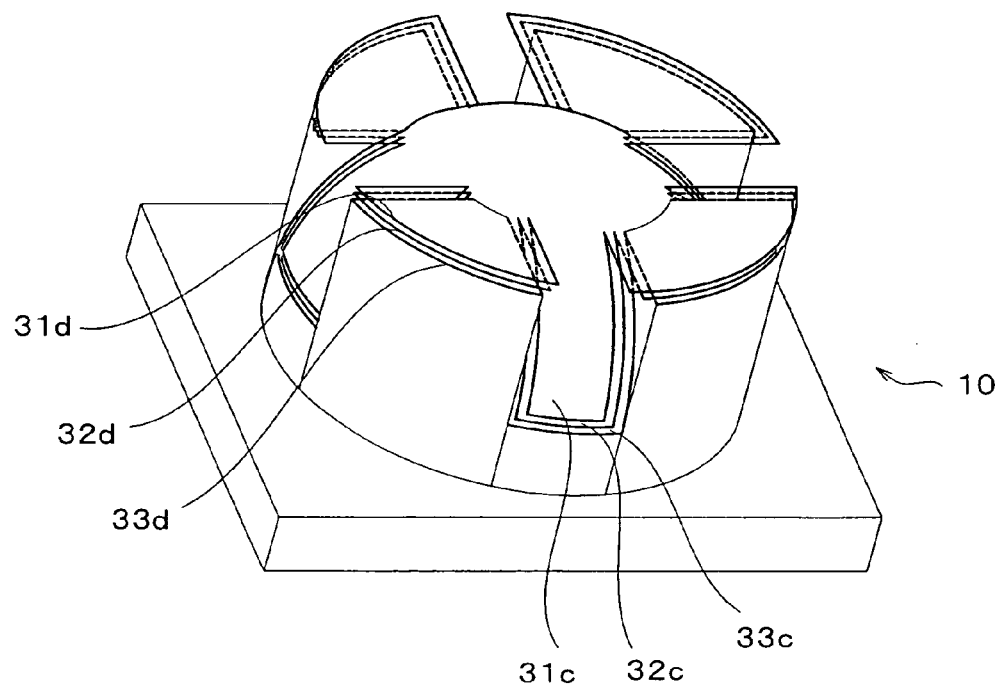
FIG. 8 is a schematic view showing a state that only partially separated flaps of three circular sheets of prepreg are formed in a semi-spherical shape on the first press die.

To carry out molding using the first and the second press dies 10 and 11, first, the three circular prepregs 31, 32, and 33 are set on the first press die 10. At that time, as shown in FIG. 8, the center portions 31a, 32a, and 33a of the circular prepreg 1 are laminated and set on the summit part of the semi-sphere 10a of the first press die 10, the respective partially separated flaps 31c, 32c, and 33c are arranged along the crosswise semi-spherical recessed groove parts 10a of the press die 10, and the respectively neighboring residual portions 31d, 32d, and 33d are put on the flat top faces of the fan-like projected parts 10b of the press die 10.

In this case, the semi-spherical recessed groove parts 10a and the fan-like projected parts 10b are not necessarily required to be completely coincident with the notch shapes of the prepreg, and they are sufficient if they are suitable for bending or curving or laminating prepreg into a predetermined three-dimensional shape.

Use of the first and the second press dies 10 and 11 with such shapes makes it possible to place and set the respective circular prepregs 31, 32, and 33 constantly at a predetermined position in the press die 10 by arranging the partially separated flaps 31c, 32c, and 33c in the crosswise recessed groove parts 10a formed between neighboring fan-like projected parts 10b. Also, the respective circular prepregs 31, 32, and 33 are notched so as to have a set of two notches each 31b, 32b, and 33b made parallel or narrowed toward the outer circumference, and on the other hand, the width of the recessed groove parts 10a of the first press die 10 is made same as or wider than the width of the partially separated flap 33c, so that the respective partially separated flaps 31c, 32c, and 33c between the respective two notches 1b are not interfered with the fan-like projected parts 10b on which the neighboring residual portions 31d, 32d, and 33d with a fan-like shape are mounted.

That is, to avoid mutual interference of the respective end edge parts of the partially separated flaps 31c, 32c and 33c and the respective fan-like projected parts 10b of the first press die 10, the notches 31b, 32b, and 33b are formed so as to be parallel to one another or narrowed toward the outer circumference.

In such a state, the second press die 11 is fitted on the first press die 10 to press and mold the center portions 31a, 32a, and 33a and the partially separated flaps 31c, 32c, and 33c of the respective circular prepregs 31, 32, and 33 by the crosswise recessed groove parts 10a of the first press die 10 and the crosswise semi-spherical projected parts 11c of the second press die 11. The width of the crosswise semi-spherical projected parts 11c is made same as or narrower than the width of the partially separated flap 33c in the concave face side (namely, the lowest layer), so that interference between the semi-spherical projected part 11c and the fan-like residual portions 31d, 32d, and 33d can be avoided.

Figure 6:
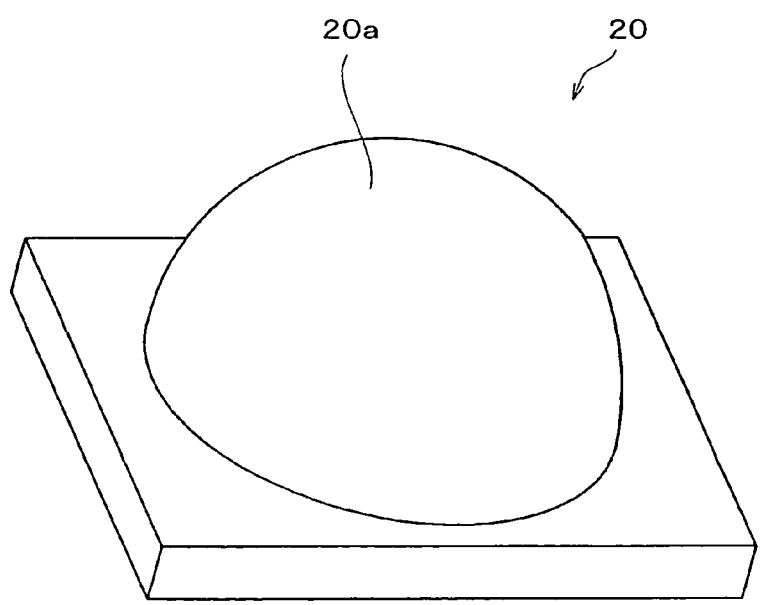
FIG. 6 is a schematic view showing a typical example of a third press die.
Figure 7:
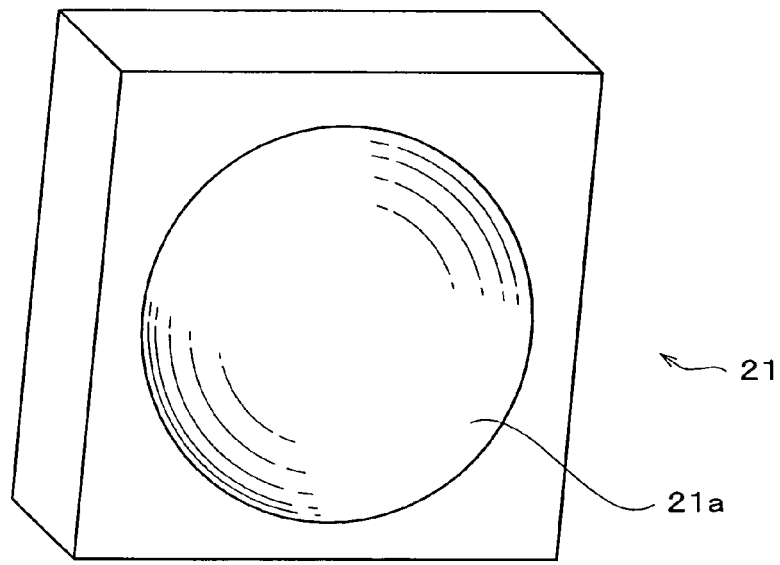
FIG. 7 is a schematic view showing a typical example of a fourth press die.
Figure 9:
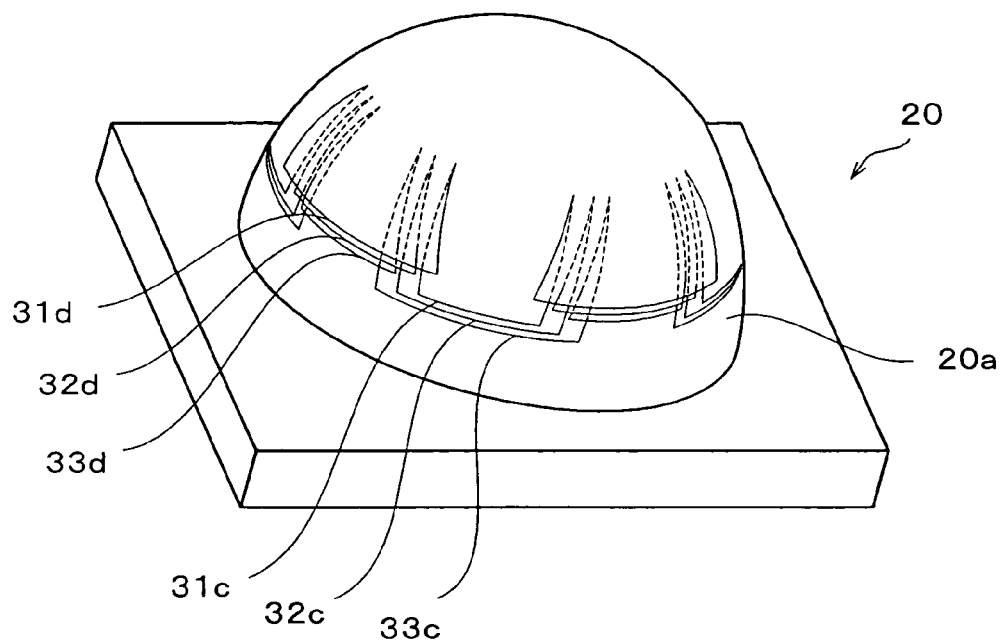
FIG. 9 is a schematic view showing a state that on the third press die, the residual portions of three sheets of prepreg are laid over the partially separated flaps such that all portions are formed into a semi-spherical shape.
Figure 10:
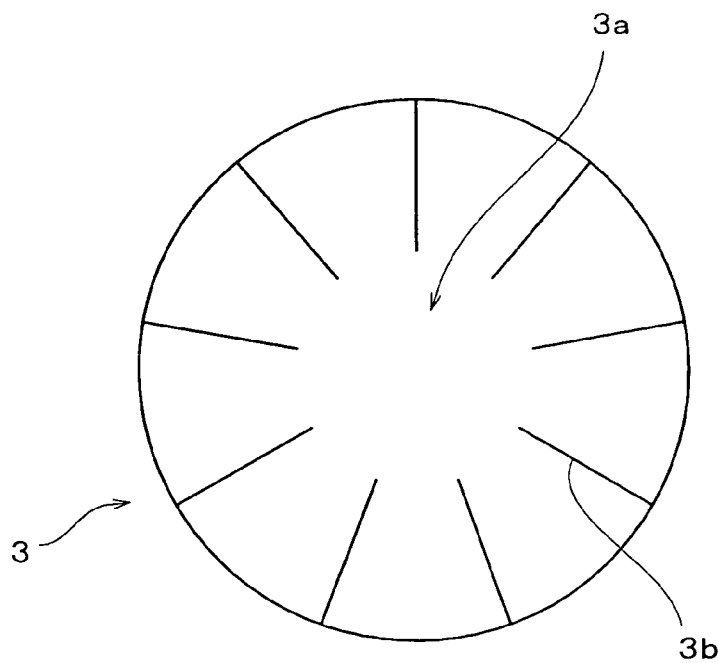
FIG. 10 is a plane view showing one example of a shape of a notch in a circular sheet of prepreg, which is a conventional molding material for a semi-spherical molded article.
Figure 11:
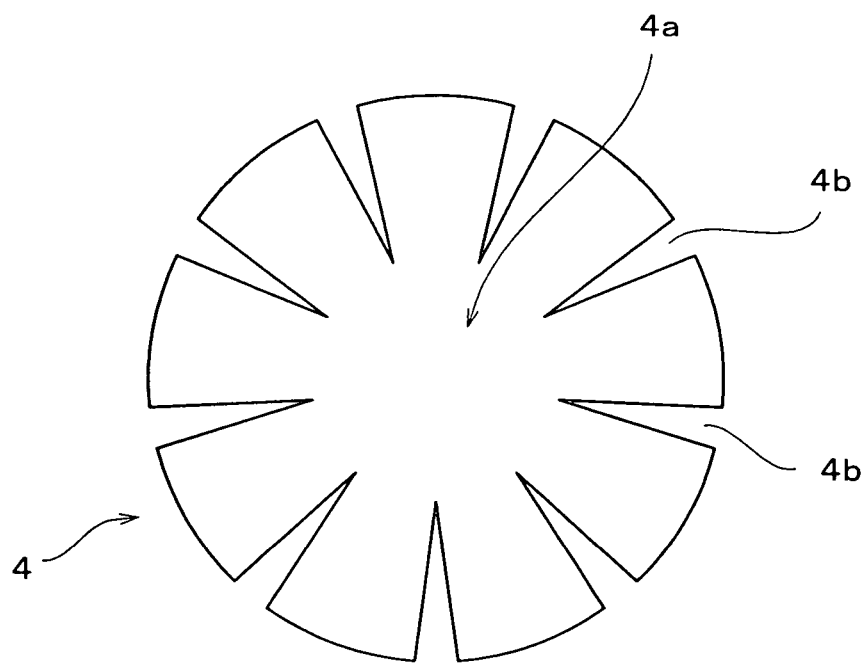
FIG. 11 is a plane view showing one example of a shape of a cutout in a circular sheet of prepreg, which is a conventional molding material for a semi-spherical molded article.

For molding to laminate the end edge parts of the fan-like residual portions 31d, 32d, and 33d on the laminated and molded partially separated flaps 31c, 32c, and 33c, a third press die 20 having a semi-spherical projected part 20a as shown in FIG. 6 and a fourth press die 21 having a semi-spherical recessed part 21a with approximately same diameter as that of the semi-spherical projected part 20a as shown in FIG. 7 are employed. The center portions 31a, 32a, and 33a are set being positioned at the center of the projected part 20a of the third press die 20, and the fourth press die 21 having the semi-spherical recessed part 21a is fitted on the third press die 20 to press and mold the prepreg. In this case, as shown in FIG. 9, the end edge parts of the residual portions 31d, 32d, and 33d are laid over the surface of the end edge parts of the partially separated flaps 31c, 32c, and 33c.

At the time of molding, as described above, the center portions 31a, 32a, and 33a of the circular prepregs 31, 32, and 33 and the partially separated flaps 31c, 32c, and 33c are semi-spherically curved and molded. Therefore, the residual portions 31d, 32d, and 33d are easily laminated on the end edge surface of the partially separated flaps 31c, 32c, and 33c without any wrinkles, and wrinkling in the residual portions 31d, 32d, and 33d owing to entrainment is not caused at the time of die fastening as well.

If the formation positions of the notches 31b, 32b, and 33b in the respective prepregs 31, 32, and 33 are slightly shifted in the circumferential direction, when a plurality of prepregs are laminated, the overlapping parts of the end edges of the notches 31b, 32b, and 33b are shifted, and at the same time, gaps are hardly formed in the overlapped parts, so that thickness difference can be suppressed and the quality can be improved as well. In this state, the end edges of the residual portions 31d, 32d, and 33d are laid over and semi-spherical shape formation is carried out, and further heating and curing is carried out to obtain a molded article of a fiber-reinforced composite material.

In the molding of the invention, after formation of the notches or cutouts in a plurality of prepregs, lamination of the prepregs is carried out in such a manner that the residual portions are laid over the partially separated flaps. When the cut ends (terminal ends) in the center side of the respective notches or cutouts are at the same positions among the plurality of laminated prepregs, it often becomes difficult to lay the residual portions over the partially separated flaps since the plurality of prepregs are interfered at the terminal end position, and an aperture may be left after molding. If the terminal ends of the notches or cutouts of the respective prepregs are at distance of shorter than 2 mm, terminal ends of the notches or cutouts are concentrated around a single point, and the aperture tends to be formed easily at the point. Accordingly, as a product, the strength is often decreased in the aperture position.

In the invention, it is preferable that the terminal end parts of the notches or cutouts of the respective prepregs, which are a plurality of prepregs to be laminated, are formed while being parted at distance of 2 mm or longer from one another in the center side. "To be formed while being parted" means the terminal end positions of the notches or cutouts in the center side are shifted among the respective prepregs. The shift of the terminal end positions from one another includes a case in which they are shifted along the outer rims of the prepregs and a case in which they are shifted slantingly toward the center side.

An aperture formed in one prepreg can be covered with another prepreg by shifting the terminal end parts of the notches or cutouts of a plurality of prepregs at distance of 2 mm or longer, thereby obtaining a molded article with good appearance as a whole of the product and a high strength. The distance between the neighboring terminal end parts can properly be determined depending on the curvature of the molded article, and it is sufficient if the terminal end parts of the notches or cutouts of different prepregs do not contact with others. If they are parted at distance of 5 mm or longer, the above-mentioned problems are hardly caused even in the case of a molded article with a high curvature.

At the time of molding a molded article of a fiber-reinforced composite material of the invention, press-molding is carried out by two steps: a first molding step of first forming the center parts 31a, 32a, and 33a and partially separated flaps 31c, 32c, and 33c of the circular prepregs 31, 32, and 33 in a semi-spherical shape by the first press die 10 and the second press die 11; and a second molding step of forming the residual portions 31d, 32d, and 33d in a semi-spherical shape while laying the end edges thereof over the end edges of the partially separated flaps 31c, 32c, and 33c by the third press die 20 and the fourth press die 21.

According to the method, in the first molding step, the circular prepregs 31, 32, and 33 are precisely positioned by utilizing the notches 31b, 32b, and 33b, and therefore, the molded article with uniform quality can be produced. Further, in the second molding step, since approximately a half portion of the completed product is formed in the semi-spherical shape in the first molding step, the residual portions are molded on and united with the previously formed half portion without any wrinkles.

In the above-mentioned embodiment, the two molding steps are carried out by employing respectively different two press dies. However, the fan-like projected parts 10b of the first press die 10 may be made movable members or the movable members are fitted on the circular apertures 11b of the second press die 11, so that the two-step molding is made possible by using a pair of press dies regardless of the upper and lower positioning relation. Further, depending on the shape of the molded article, molding may be carried out by first arranging the plurality of prepregs 31, 32, and 33 in the inner face of the semi-spherical projected part 11c of the second press die 11 while overlapping the partially separated flaps 31c, 32c, and 33c of the plurality of prepregs 31, 32 and 33, and then pressing the first press die 10.

Also, with respect to a configuration of the press die, use of a press die properly suitable for the shape of cut prepreg and the way of forming the notches or cutouts makes it possible to produce a molded article with a shape other than the circular shape.

As the prepreg, sheets which contain reinforcing fibers arranged evenly in one direction and which are impregnated with a matrix resin and fabrics of which at least the warp or weft is reinforcing fiber and which are impregnated with the matrix resin are preferable to be used.

In addition, those obtained by laminating prepreg sheets which contain reinforcing fibers arranged evenly in one direction in a plurality of layers in two directions, that is, in 0° direction and 90° direction; those obtained by laminating the sheets in ±45° direction; or those objected by repeatedly layering them may be used for molding. Further, with respect to the prepreg of fabrics, lamination may be carried out in a plurality of layers at different orientation angles of the fibers. Use of such prepreg laminates brings high strength in multiple directions owing to the reinforcing fibers, and thus the strength can well be balances.

As the types of the reinforcing fibers, carbon fiber, glass fiber, and organic fiber (including aramid fiber and PBO fiber) may be used. Further, a plurality of reinforcing fibers may be woven in a sheet of prepreg, or at the time of molding, prepregs of different reinforcing fibers may be laminated and simultaneously molded. Particularly, a carbon fiber is preferably used since a molded article light in weight and having a high strength can be obtained, and also a glass fiber is relatively economical and easily available among the above-mentioned fibers, and therefore is preferably used.

According to the production method of the invention, as a molded article of a fiber-reinforced composite material, products with various three-dimensional shapes such as rectangular box-like, spindle-like, and elliptical spherical shapes other than the semi-spherical shape can be obtained. Further, the method may be employed for producing practically flat molded articles having projected and recessed parts.

The molded article of a fiber-reinforced composite material obtained by the production method of the invention is not limited to a final product but it is possible that container-like preliminarily molded articles are molded by the method of the invention, and then the preliminarily molded articles are combined in a molding die and made to be a final product by inner pressure molding, vacuum bag molding, autoclave molding, compression molding and the like. The preliminarily molded articles are also included as the molded article of a fiber-reinforced composite material of the invention.

The types of the above-mentioned matrix resin are not particularly limited and may include both thermosetting resins such as epoxy resin, bismaleimide resin, and phenol resin and thermoplastic resins such as polyolefins and polyvinyl acetal, and if the thermosetting resins are used, the strength of the molded article is improved and thus it is preferable. Among them, the epoxy resin is particularly preferable since it is excellent in the adhesion strength with reinforcing fibers.

In the case where a final product is produced from preliminarily molded articles using prepreg of which the matrix resin is a thermosetting resin, while the un-cured state of the thermosetting resin is kept, the preliminarily molded articles are molded by the above-mentioned production method of the invention, and then the preliminarily molded articles are further heated and pressurized to carry out curing and forming, thereby obtaining the final product. In this case, although the optimum conditions at the time of the curing and molding depend the types of the thermosetting resins, if the curing is insufficient, surface disorder and pin hole formation may possibly be caused owing to fluidity of un-cured resin. On the other hand, if molding is carried out under too strict conditions, molding unevenness and appearance deterioration become significant.

However, in terms of the productivity of the molded article, it is required to obtain a molded article with good appearance within a time as short as possible. Therefore, a desirable resin composition is used so as to carry out the molding within a short time.

With respect to the molded article of a fiber-reinforced composite material of the invention, it is preferable to use an epoxy resin composition comprising the following components A, B, C, and D:

component A: an epoxy resin;
component B: an amine compound (component B-1) having at least one sulfur atom in a molecule and/or a reaction product (component B-2) of an amine compound having at least one sulfur atom in a molecule with an epoxy resin;
component C: an urea compound; and
component D: a dicyanodiamide.

The component A of the invention is an epoxy resin. Examples thereof include, as bifunctional epoxy resin, bisphenol A type epoxy resin, bisphenol F type epoxy resin, biphenyl type epoxy resin, naphthalene type epoxy resin, dicyclopentadiene type epoxy resin, fluorene type epoxy resin, or their modified epoxy resins; as tri- or more polyfunctional epoxy resin, phenol novolak type epoxy resin, cresol type epoxy resin, glycidylamine type epoxy resin such as tetraglycidyldiaminodiphenylmethane, triglycidylaminophenol, and tetraglycidylamine, glycidyl ether type epoxy resin such as tetrakis (glycidyloxyphenyl) ethane and tris (glycidyloxymethane), and their modified epoxy resins; and brominated epoxy resin obtained by brominating these epoxy resins, but they are not limited to these examples. As the component A, one or more types of these epoxy resins may be used in combination.

The component B of the invention is an amine compound (component B-1) having at least one sulfur atom in a molecule and/or a reaction product (component B-2) of an amine compound having at least one sulfur atom in a molecule with an epoxy resin.

The component B-1 is not particularly limited if it is an amine compound having at least one sulfur atom in a molecule, and preferable examples of the component to be employed include 4,4'-diaminodiphenylsulfone, 3,3'-diaminodiphenylsulfone, 4,4'-diaminodiphenyl sulfide, bis(4-(4-aminophenoxy)phenyl)sulfone, bis(4-(3-aminophenoxy) phenyl)sulfone, 4',4-diaminodiphenyl sulfide, o-trian sulfide, and their derivatives.

On the other hand, the component B-2 is a reaction product of the above-mentioned amine compound having at least one sulfur atom in a molecule with the above-mentioned epoxy resin. In the epoxy resin composition of the invention, the component A and the component B-1 are mixed and reacted to obtain a mixture containing the component B-2, and it is not particularly necessary to separate the component B-2 from the mixture.

In the process of producing the epoxy resin composition of the invention, portions or all of the substances added as the component A and the component B-1 may be converted into the component B-2.

Further, in the case, either one or both of the component A and the component B-1 may be consumed completely and converted into the component B-2.

The component C of the invention is a urea compound. Examples thereof to be used preferably include dichlorodimethylurea, phenyldimethylurea, o-tolidine sulfone, bis(4-(3-aminophenoxy)phenyl)sulfone, mesoxalylurea, barbituric acid, hydroxybarbituric acid, dilituric acid, and violuric acid. Among them, as the component C, a compound having no halogen in the molecule, for example, phenyldimethylurea, has high reactivity and low toxicity and therefore is particularly preferable to be used.

The content of the component C in the epoxy resin composition is preferably 1 to 15% by mass, more preferably 3% by mass or higher and 12% by mass or lower. If the content of the component C is less than 1% by mass, the curing reaction may not be completed within in a short time in some cases, and if it exceeds 15% by mass, the resin composition may not be stored for a long duration at a room temperature in some cases and thus it is not desirable in terms of storage of resin.

In the case a solid substance is used as the component C, the substance to be used has an average particle diameter of preferably 150 µm or smaller, and more preferably 50 µm or smaller. If the average particle diameter exceeds 150 µm, the dispersion speed of the particles is decreased, and consequently, the curing reaction speed is retarded to result in the probability of failure of curing within a short time, this is one important effect of the invention.

The component D in the invention is a dicyanodiamide. The dicyanodiamide works as a curing agent for the epoxy resin, and use of the component in combination with other components of the invention makes it possible to carry out the curing at a relatively low temperature within a short time.

In the invention, the content of the component D in the epoxy resin composition is preferably 0.1 to 10% by mass. Also, if the average particle diameter of the component D is 150 µm or smaller, especially 50 µm or smaller, the dispersibility is improved and the reaction speed is fastened and therefore it is preferable.

The epoxy resin of the invention may further contain proper amounts of inorganic fine particles such as ultrafine powder type silica; a pigment; an elastomer, a defoaming agent; aluminum hydroxide, magnesium oxide, a bromine-containing compound or a phosphorus type compound to be a flame retardant; a thermoplastic resin such as polyvinyl formal, polyvinyl acetal, polyvinyl butyral, or polyhydroxy polyether for improvement of handling easiness and flexibility; an imidazole derivative, a metal complex salt or a tertiary amine compound to be a catalyst in the curing reaction.

The epoxy resin composition of the invention is preferable to have a sulfur atom content in a range of 0.2 to 7% by mass in the epoxy resin composition. If the sulfur atom content is less than 0.2% by mass, it becomes difficult to complete the curing and forming within a short time, and if it exceeds 7% by mass, the resin composition may not be stored for a long duration at a room temperature in some cases and thus it is not desirable in terms of storage of resin.

Use of the above-mentioned epoxy resin makes it possible to complete the curing and forming within a short time. Especially, if high pressure is applied at the time of molding, the curing can be carried out within a further shortened time and therefore employment of compression molding is most preferable as such a molding method. In the case of employing the compression molding, if the molding pressure is 20 kgf/cm$^2$ or higher, molding may be carried out within 15 minutes and thus the productivity is improved. Particularly, if the molding is carried out at 80 kgf/cm$^2$ or higher, molding can be carried out within 5 minutes and therefore, it is more preferable. The temperature condition is not particularly limited as long as the condition is suitable for curing the thermosetting resin, and temperature of 130° C. or higher and 220° C. or lower, more preferably 140° C. or higher and 180° C. or lower results in shortening the molding time and gives good appearance, and thus it is more preferable.

Molding according to the compression molding gives a molded article by laminating a plurality of prepregs and uniting and curing them. For example, a molding manner to be employed may include a case of laminating and molding a preliminarily molded article, which comprises reinforcing fibers in form of a fabric, on and with a plurality of preliminarily molded articles of which reinforcing fibers are unidirectionally oriented materials, and a case of carrying out integral molding by further sticking SMC to at least a portion of the surface of a preliminarily molded article. Particularly, sticking SMC enables production of even a molded article with a complicatedly curved shape.

Hereinafter, the invention will be described more in detail with reference to Examples and Comparative Examples.

EXAMPLES

In the following Examples, components used for matrix resins were as follows. In addition, those which are shown without the content of the sulfur atom do not contain the sulfur atom in the molecule.

YPDN701: cresol novolak type resin (YDPN-701, manufactured by Tohto Kasei Co., Ltd.)

Ep828: bisphenol A type liquid epoxy resin (Epikote 828, manufactured by Japan Epoxy Resin Co., Ltd.)

Ep807: bisphenol F type liquid epoxy resin (Epikote 807, manufactured by Japan Epoxy Resin Co., Ltd.)

Ep1001: bisphenol A type solid epoxy resin (Epikote 1001, manufactured by Japan Epoxy Resin Co., Ltd.)

Ep604: glycidylamine type epoxy resin (Epikote 604, manufactured by Japan Epoxy Resin Co., Ltd.)

N-740: phenol novolak type epoxy resin (EPICLON N-740, manufactured by Dainippon Ink and Chemicals, Incorporated)

DDS: diaminophenylsulfone (Seikacure S, sulfur atom content: 12.9% by mass, manufactured by Wakayama Seika Co., Ltd.)

BAPS: 4,4'-diaminodiphenyl sulfide (BAPS, sulfur atom content: 7.4% by mass, manufactured by Wakayama Seika Co., Ltd.)

PDMU: 3-phenyl-1,1-dimethylurea

DCMU: 3,4-dichlorophenyl-N,N-dimethylurea

DICY: dicyanodiamide (average particle diameter: 7 μm)

PVF: polyvinyl formal (Vinylec E, manufactured by Chisso Corporation)

Example 1

The prepreg employed in this example was unidirectional prepreg (carbon fiber content: 56% by volume) having a fiber thickness (areal weight) of 175 g/m$^2$ and a resin content of 35% and obtained by heating and impregnating a unidirectional material comprising carbon fiber in unidirectional arrangement, TR 50S manufactured by Mitsubishi Rayon Co., Ltd., in both sides with an epoxy resin composition obtained by heating and mixing YDPN 701 35 parts by mass, Ep828 59 parts by mass, DICY 4 parts by mass, and DCMU 2 parts by mass and free from sulfur atom. A laminate obtained by layering such unidirectional materials successively in the fiber direction at 0° and in the fiber direction at 90 was used as one constituent unit set of prepreg.

First, prepreg sets were cut out one by one, and as shown in FIG. 3, three constituent unit sets of prepreg were laminated. The respective prepreg sets 31, 32, and 33 were notched to form the notches 31b, 32b, and 33b in such a manner that the partially separated flaps 31c, 32c and 33c were successively widened from the upper layer to the lower layer thereof. The center portions 31a, 32a, and 33a in the respective prepreg sets 31, 32, and 33 were set at the summit part of the crosswise semi-sphere 10a of the first press die as shown in FIG. 4, the partially separated flaps 31c, 32c, and 33c were set along the groove faces of the semi-spherical recessed groove parts 1a, and the residual portions 31d, 32d, and 33d were put on flat faces of the fan-like projected parts 10b of the press die 10.

In this example, the width of the partially separated flaps 33c in the lowest layer was set to be same as the intervals of the fan-like projected parts 10b of the first press die 10 to carry out positioning. Here, before the first and the second press dies 10 and 11 were fitted, prepreg sets were heated at 80° C. for 10 seconds using an IR heater for softening the prepreg sets. Next, the second press die 11 shown in FIG. 5 was fitted on the first press die 10 to press and mold the crosswise partially separated flaps 31c, 32c, and 33c including the center portions 31a, 32a, and 33a and to form a semi-spherical shape as shown in FIG. 8. Thereafter, the first and the second press dies 10 and 11 are cooled to 20° C. by air blow, and then, the shape of the prepreg was fixed and released from the dies.

The prepreg having the fixed shape as that obtained at the time of releasing from the dies was placed on the semi-spherical projected part 20a of the third press die 20 as shown in FIG. 6 while the summit parts of the center portions 31a, 32a, and 33a of the prepreg sets were conformed to the summit part of the projected part 20a, and softened by heating at 80° C. for 10 seconds using an IR heater. Then, the fan-like residual portions 31d, 32d, and 33d were curved into a semi-spherical shape and laid over and stuck to the end edge parts of the partially separated flaps 31c, 32c, and 33c by putting the fourth press die 21 shown in FIG. 7 to form a semi-spherical shape as shown in FIG. 9. Thereafter, the press dies were cooled to 20° C. by air blow, and then the prepreg was released from the dies while the formed shape is fixed to obtain a preliminarily molded article 41.

The preliminarily molded article 41 was set in a lower die for compression molding (not shown), which had a shear edge structure, and load of a pressure 4 kgf/cm$^2$ was applied at 120° C. for 2 hours to carry out curing and molding the molded article, thereby obtaining a final product. The final product was excellent in the laminate strength, appearance, and production stability, free from voids at the notch positions, and moderated in uneven thickness owing to the even dispersion of the laid over parts of the partially separated flap and the residual portions.

Example 2

A preliminarily molded article 41 was obtained in the same manner as in Example 1, except that a material obtained by impregnating a unidirectional material (areal weight: 125 g/m$^2$) comprising carbon fiber TR 50S manufactured by Mitsubishi Rayon Co., Ltd. in unidirectional arrangement with an epoxy resin composition obtained by kneading and making the following composition uniform at 50° C. (resin content: 30%) was used as the prepreg. The sulfur atom content of the epoxy resin composition was 0.77%.

(component A) a molten mixture of Ep828: Ep1001=47: 35 (by mass) 82 parts by mass, (component B) DDS 6 parts by mass, (component C) PDMU (average particle diameter: 50 μm) 5 parts by mass, and (component D) DICY 7 parts by mass.

The obtained preliminarily molded article was free from wrinkles and fiber disorder, and had good appearance.

The preliminarily molded article was set in a lower die of dies for compression molding (not shown), which had a shear edge structure, and load of a pressure 80 kgf/cm$^2$ was applied at 140° C. for 5 minutes to carry out curing and molding the molded article, thereby obtaining a final product. The final product was excellent in the appearance, and production stability, free from voids at the notch positions, and moderated in uneven thickness owing to the even dispersion of the laid over parts of the partially separated flap and the residual portions. In such a manner that the molded article as excellent as the molded article of Example 1 was obtained, and particularly, the molding was completed within a time as short as 5 minutes.

Examples 3 to 10

Preliminarily molded articles and final products were obtained in the same manner as Example 2, except that the epoxy resin compositions shown in Table 1 were used as epoxy resins and the A and component Bs were reacted preliminarily based on the necessity. In any case, the preliminarily molded articles were all free from wrinkles or fiber disorder and had good appearance. The molded articles as final products were also provided with good appearance.

appearance. The molded article as the final product was also provided with good appearance.

Comparative Example

Using the same prepreg as that of Example 1, circular prepregs 31, 32, and 33 notched similarly to the case of Example 1 were laminated and directly press molded in a spherical shape using only the third press die 20 shown in FIG. 6 and the fourth press die 21 shown in FIG. 7. The conditions for the molding were made same as those of Example 1. As a result, prepreg was entrained in the press dies

TABLE 1

| Component | Compound name | Example 3 | Example 4 | Example 5 | Example 6 | Example 7 | Example 8 | Example 9 | Example 10 |
|---|---|---|---|---|---|---|---|---|---|
| Component A | Ep828 | 86 | 84 | 68 | | | | | 77 |
| (part by mass) | Ep807 | | | | 70 | 58 | | | |
| | Ep604 | | | | | | 70 | | |
| | N740 | | | | | | | 70 | |
| Component B | DDS | 2 | 4 | 20 | 20 | 20 | | | 10 |
| (part by mass) | BAPS | | | | | | 20 | 20 | |
| Component C | PDMU | 5 | 5 | 5 | | | 5 | 5 | |
| (part by mass) | DDMU | | | | 3 | 15 | | | 5 |
| Component D | DICY | 7 | 7 | 7 | 7 | 7 | 5 | 5 | 5 |
| (part by mass) | | | | | | | | | |
| Additive | PVF | | | | | | | | |
| Sulfur atom content (% by mass) | | 0.26 | 0.52 | 2.58 | 2.58 | 2.58 | 1.48 | 1.48 | 1.29 |

Examples 11 to 14

Preliminarily molded articles and final products were obtained in the same manner as Example 2, except that the epoxy resin compositions shown in Table 2 were used as epoxy resins and the A and component Bs were reacted preliminarily based on the necessity. In any case, the preliminarily molded articles were all free from wrinkles or fiber disorder and had good appearance. However, the final products seemed to be smooth at a glance but had appearance with a few wrinkles and slight fogging.

and wrinkles and fiber disorder were caused to result in failure of obtaining a preliminarily molded article with sufficiently high quality.

EFFECTS OF THE INVENTION

As described above, in the method of producing a molded article of a fiber-reinforced composite material of the invention, it is made possible to produce a product with no wrinkle and uniform quality at a high efficiency even if the product has a three-dimensional shape with a high curvature. Further,

TABLE 2

| Component | Compound name | Example 11 | Example 12 | Example 13 | Example 14 |
|---|---|---|---|---|---|
| Component A | Ep828 | 87 | 33 | | |
| (part by mass) | Ep807 | | | 72.14 | 57 |
| | Ep604 | | | | |
| | N740 | | | | |
| Component B | DDS | 1 | 55 | 20 | 20 |
| (part by mass) | BAPS | | | | |
| Component C | PDMU | 5 | 5 | 0.9 | 16 |
| (part by mass) | DDMU | | | | |
| Component D | DICY | 7 | 7 | 7 | 7 |
| (part by mass) | | | | | |
| Additive | PVF | | | | |
| Sulfur atom content (% by mass) | | 0.13 | 7.10 | 2.58 | 2.58 |

Example 15

A preliminarily molded article and final product were obtained in the same manner as Example 2, except that carbon fiber fabric TR 3110 (areal weight 200 g/m$^2$) manufactured by Mitsubishi Rayon Co., Ltd. was used in place of the prepreg comprising the carbon fiber TR 50S manufactured by Mitsubishi Rayon Co., Ltd. The preliminarily molded article was free from wrinkles and fiber disorder and had good selection of a proper resin composition as a matrix resin makes a molded article particularly excellent in the appearance available.

The molded article of a fiber-reinforced composite material of the invention may preferably be used as a golf club, a helmet, an outer board for motor cycles, automobiles, high speed vehicles, aircrafts and the like, and a box for electronic appliances such as personal computers, mobile phones and the like.

The invention claimed is:

1. A method of producing a molded article of a fiber-reinforced composite material by simultaneously molding a plurality of sheets of prepreg cut out in a predetermined shape, the plurality of sheets of prepreg having a large number of continuous reinforcing fibers impregnated with a matrix resin, the method comprising steps of:
forming a continuous plurality of notches or cutouts from a center portion to outer circumference in respective prepregs so as to form at least one set of a partially separated flap and a residual portion in a same position corresponding to each prepreg;
arranging the respective prepregs to be laminated at predetermined positioning portions of a first press die using partially separated flaps of the prepregs as positioning pieces;
forming a first desired three-dimensional shape by pressing the partially separated flaps of the respective prepregs except residual portions of the respective prepregs with a second press die fitted to the first press die and the first press die; and
forming a second desired three-dimensional shape as a whole by arranging the residual portion adjacent to the partially separated flap to be laminated at a predetermined part of a third press die that is a different press die from the first press die, overlapping end edge parts of residual portions on the partially separated flaps at the predetermined part of the third press die that is a different press die from the first press die, and pressing the residual portions of the respective prepregs with a fourth press die fitted to the third press die and the third press die.

2. The method of producing a molded article of a fiber-reinforced composite material according to claim 1, wherein a width of the partially separated flaps formed by the notches or cutouts is made to be parallel or narrowed toward the outer circumference.

3. The method of producing a molded article of a fiber-reinforced composite material according to claim 1, wherein a reinforcing fiber to be employed for the prepreg is at least one kind of fibers selected from carbon fiber, glass fiber, and organic fiber.

4. The method of producing a molded article of a fiber-reinforced composite material according to claim 1, wherein the reinforcing fiber to be employed for the prepreg form a unidirectional material of the reinforcing fiber arranged evenly in one direction or a material having a fabric structure of which at least the warp or weft is made of the reinforcing fibers arranged evenly in one direction.

5. The method of producing a molded article of a fiber-reinforced composite material according to claim 1, wherein the step of forming the first desired three-dimensional shape includes steps of:
heating the prepregs before fitting the second press die to the first press die; and
fitting the second press die to the first press die after heating the prepregs.

6. The method of producing a molded article of a fiber-reinforced composite material according to claim 1, wherein the shapes of the partially separated flaps formed in the respective prepregs are similar to or coincident with one another, and the notches or cutouts are formed in such a manner that a width of the partially separated flap to be arranged in the concave face side of the molded article by pressing is not narrower than a width of the partially separated flap to be arranged in the convex face side with respect to all the partially separated flaps to be laid over at a same position.

7. The method of producing a molded article of a fiber-reinforced composite material according to claim 1, wherein, in the plurality of prepregs to be laminate, the notches or cutouts of the respective prepregs to be laminated are formed in such a manner that cut edges in a center side are spaced at a distance of 2 mm or longer from one another.

8. The method of producing a molded article of a fiber-reinforced composite material according to claim 1, wherein a matrix resin to be employed for the prepreg is a thermosetting resin.

9. The method of producing a molded article of a fiber-reinforced composite material according to claim 8, wherein the thermosetting resin is an epoxy resin composition.

10. The method of producing a molded article of a fiber-reinforced composite material according to claim 9, wherein the epoxy resin composition comprises the following component A, component B, component C, and component D:
component A: an epoxy resin;
component B: an amine compound (component B-1) having at least one sulfur atom in a molecule and/or a reaction product (component B-2) of an amine compound having at least one sulfur atom in a molecule with an epoxy resin;
component C: a urea compound; and
component D: a dicyanodiamide.

11. The method of producing a molded article of a fiber-reinforced composite material according to claim 10, wherein contents of the sulfur atom and the component C in the epoxy resin composition are 0.2 to 7% by mass and 1 to 15% by mass, respectively.

12. The method of producing a molded article of a fiber-reinforced composite material according to claim 10, wherein the component C is a granular material with an average particle diameter of 150 µm or smaller.

13. A method of producing a molded article of a fiber-reinforced composite material, the method including further heating and pressurizing the preliminarily molded article of a fiber-reinforced composite material according to claim 1 for curing and molding.

14. The method of producing a molded article of a fiber-reinforced composite material according to claim 13, wherein the step of further heating and pressurizing the preliminarily molded article is carried out by compression molding.

15. The method of producing a molded article of a fiber-reinforced composite material according to claim 14, wherein the compression molding is carried out at molding pressure of 20 kgf/cm$^2$ or higher and molding time in 15 minutes.

16. The method of producing a molded article of a fiber-reinforced composite material according to claim 14, wherein the molding temperature at the time of the compression molding is 120° C. or higher.

17. A molded article of a fiber-reinforced composite material obtained by uniting and curing a plurality of laminated prepregs by the method of producing a molded article of a fiber-reinforced composite material according to claim 13.

* * * * *